(12) United States Patent
Schwartz

(10) Patent No.: US 7,953,155 B2
(45) Date of Patent: May 31, 2011

(54) METHODS OF SELECTING AN ENCODING MODE

(75) Inventor: Mayer D. Schwartz, Portland, OR (US)

(73) Assignee: Tut Systems, Inc., Pleasanton, CA (US)

( * ) Notice: Subject to any disclaimer, the term of this patent is extended or adjusted under 35 U.S.C. 154(b) by 1930 days.

(21) Appl. No.: 11/015,374

(22) Filed: Dec. 16, 2004

(65) Prior Publication Data

US 2006/0133509 A1    Jun. 22, 2006

(51) Int. Cl.
*H04N 7/12* (2006.01)

(52) U.S. Cl. .................................. 375/240.18

(58) Field of Classification Search ............ 375/240.18, 375/240.78, 240.24, 240.03, 240.23, 240.25, 375/240.26, 240.17
See application file for complete search history.

(56) References Cited

U.S. PATENT DOCUMENTS

| | | | |
|---|---|---|---|
| 6,154,572 A | 11/2000 | Chaddha | |
| 6,192,081 B1 | 2/2001 | Chiang et al. | |
| 6,332,030 B1 | 12/2001 | Manjunath et al. | |
| 6,628,709 B2 | 9/2003 | Lin et al. | |
| 6,975,680 B2 * | 12/2005 | Demos | ............ 375/240.02 |
| 2003/0179943 A1 | 9/2003 | Okada et al. | |

OTHER PUBLICATIONS

PCT International Search Report, RE: Application #PCT/US05/04642 Feb. 11, 2005.
EPC Search Report, RE: Application # 05713518.8-2223/1825601 PCT/US2005004642 Jan. 29, 2009.
"Low-Complexity Macroblock Mode Selection for H.264/AVC Encoders"—Hyungjoon Kim, et al Oct. 24, 2004.
EPC Search Report, RE: Application #05713518.8-2223/1825601 PCT/US2005004642 Jan. 29, 2009.
Hyungjoon Kim, et al "Low-complexity macroblock mode selection for H.264/AVC encoders" (whole document) Oct. 24, 2004.
EPC Rejection, RE: Application #05713518.8-2223 Mar. 13, 2009.

\* cited by examiner

*Primary Examiner* — Khai Tran
(74) *Attorney, Agent, or Firm* — Stewart M. Wiener

(57) ABSTRACT

Information needed to generate an encoded version of a matrix of j transform coefficients $c_0 \ldots c_{j-1}$ representing a block of digital video data is determined by forming a numerical signature $\sigma$ of the matrix and looking up a value for the information needed in an array employing the signature $\sigma$ as an index to the array.

41 Claims, 5 Drawing Sheets

FIG. 1
PRIOR ART $$\begin{bmatrix} 156 & 87 & 1 & 1 \\ -12 & -1 & -1 & 0 \\ 0 & 0 & 0 & 0 \\ 0 & 0 & 0 & 0 \end{bmatrix}$$

$$\begin{bmatrix} C0 & C1 & C5 & C6 \\ C2 & C4 & C7 & C12 \\ C3 & C8 & C11 & C13 \\ C9 & C10 & C14 & C15 \end{bmatrix}$$

| C0 | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|
| 156 | 87 | -12 | 0 | -1 | 1 | 1 | -1 | 0 | 0 | 0 | 0 | 0 | 0 | 0 | 0 |

US 7,953,155 B2

METHODS OF SELECTING AN ENCODING MODE

BACKGROUND OF THE INVENTION

The present invention relates to compression coding of video signals, and more particularly to a method for improving the efficiency of predicting the number of bits required to encode a matrix of transform coefficients for the International Telecommunication Union-Telecommunication Standardization Sector (ITU-T) H.264 video compression standard (H.264). As in previous video coding standards, the Video Coding Layer (VCL) of H.264 uses a hybrid of temporal and spatial prediction as well as transform coding to compress video sequences.

In the coding process, a picture is divided into slices, each slice representing a portion of the picture that can be decoded independently of the rest of the picture. The slices are divided into macroblocks. A macroblock consisting of a 16×16 block of luma samples and two corresponding 8×8 blocks of chroma samples is used as the basic H.264 processing unit. An H.264 compliant encoder will calculate a predicted value for each sample in a macroblock. The predicted values are then subtracted from the actual values to form prediction residuals. Once the prediction residuals have been calculated, they are transformed, generating 4×4 blocks of transform coefficients that are then scaled and quantized. The quantized transform coefficients are entropy encoded and transmitted. Two methods for encoding the quantized transform coefficients are supported by H.264. One is Context-Adaptive Variable Length Coding (CAVLC), the other is Context-Adaptive Binary Arithmetic Coding (CABAC). CAVLC maps syntax elements to various Variable Length Coding (VLC) tables using information from already transmitted syntax elements. This mapping improves the entropy encoding performance compared to using a single VLC table. The encoder can use a variety of methods, called coding modes, to encode a macroblock.

The selection of coding modes available to the encoder for a given macroblock depends on the type of slice the macroblock belongs to. In the main profile, three slice types are supported by the H.264 standard: intra-coded (I) slices, predictive-coded (P) slices, and bi-predictive (B) slices. The specific mode selected from the modes available for coding a macroblock from a particular type of slice depends on the image content of that macroblock. There are a total of 13 intra-coding modes available to all macroblocks regardless of slice type. Additionally 5 inter-coding modes are available for P slices (plus skipped) and 23 inter-coding modes are available for B slices (plus skipped). P-slice and B-slice macroblocks are treated similarly in terms of their division into sub-blocks and the coding modes used on the sub-blocks. However, unlike P-slice macroblocks, macroblocks from B-slices can use two distinct reference picture buffers, respectively called the first and second reference picture buffers.

Almost any encoder for the H.264 standard performs some variation of a rate-distortion (RD) optimization algorithm to determine the best coding mode for each macroblock. This process is known as mode decision. The RD optimization algorithm is applied on a macroblock by macroblock basis and attempts to find the best trade-off between the number of bits needed to encode a given macroblock versus the magnitude of the prediction residuals of the given macroblock. The trade-off function is represented by the equation:

$$J(MB, mode, Q) = SSD(MB) + \lambda(Q) * R(MB, mode, Q) \quad \text{(equation 1)}$$

where MB represents the given macroblock, including the original picture elements (pels), reconstructed pels and slice type. SSD is a difference term, typically a sum of squared differences, $\lambda(Q)$ is a multiplier dependent on the quantizer Q and the slice type, and R is the number of bits needed to encode the macroblock. For each MB to be encoded, a transform needs to be calculated for each coding mode available for the MB's slice type. This, as well as the calculation of the SSD terms, must be done before the calculation of R(MB, mode, Q). The best trade-off is obtained by varying the mode for a given Q and MB in order to minimize the function J. In any practical implementation, Q is fixed for each macroblock.

Due to the entropic nature of the encoding, a large number of transform coefficients tend to equal positive one, negative one or zero. Non-zero coefficients tend to be found in the upper left hand portion of a given matrix and the coefficients in the bottom right hand corner of the matrix tend to equal zero, as shown in FIG. 1 for a generic transform coefficient matrix. That is why the H.264 standard specifies two different "zig-zag scans" (one for frame encoding and a different one for field encoding) to re-order the matrix coefficients in the sequence $c_0$-$c_{15}$ such that the coefficients more likely to be non-zero are ordered first, followed by the coefficients more likely to equal zero. This prevents the encoder from having to take up bandwidth transmitting a string of essentially null information. Much of the compute time of an H.264 video encoder is spent minimizing J(MB, mode, Q). This necessitates calculating R(MB, mode, Q) for all applicable coding modes for every single macroblock. Calculation of R(MB, mode, Q) is a very computationally intensive process. Therefore, in order to have a good real-time encoder, R(MB, mode, Q) needs to be calculated in as efficient a manner as possible.

What is needed is a method for quickly determining R(MB, mode, Q) that works on most H.264 transform matrices.

SUMMARY OF THE INVENTION

In accordance with a first aspect of the invention there is provided a method for determining information needed to generate an encoded version of a matrix of j transform coefficients $c_0 \ldots c_{j-1}$ representing a block of digital video data, the method comprising forming a numerical signature $\sigma$ of the matrix, and looking up a value for the information needed in an array employing the signature $\sigma$ as an index to the array.

In accordance with a second aspect of the invention there is provided a method of employing a mode selection function J for selecting a coding mode from a plurality of coding modes for a matrix of j transform coefficients $c_0 \ldots c_{j-1}$ representing a block of digital video data, the method comprising forming a numerical signature $\sigma$ of the matrix, looking up at least one value of a parameter R in an array using $\sigma$ as an index to the array, wherein J is a function of R and each value of R equals the size, in bits, of an encoded version of the matrix encoded with one of the plurality of coding modes, using each value of R as an input to an algorithm to determine a corresponding value of J, and selecting the coding mode corresponding to a minimum value of J.

In accordance with a third aspect of the invention there is provided a method for determining a sequence of bits S equivalent to an encoded version of a matrix of transform coefficients $c_0 \ldots c_{j-1}$ representing a block of digital video data, the method comprising forming a numerical signature $\sigma$ of the matrix, looking up at least one value for a parameter R in a coding mode array using $\sigma$ as an index to the array, wherein each value of R equals the size, in bits, of an encoded version of the matrix encoded with one of a plurality of coding modes, using each value of R as an input to a mode selection function J to determine a corresponding value of J, selecting the coding mode corresponding to the smallest value of J, and selecting a value of S from a bit stream array, the selected value being uniquely identified by a and the selected coding mode.

In accordance with a fourth aspect of the invention there is provided a computing machine for receiving a matrix of j transform coefficients $c_0 \ldots c_{j-1}$, the coefficients representing a block of digital video data, the machine being programmed to operate on the coefficients $c_0 \ldots c_{j-1}$ to determine information needed to generate an encoded version of the matrix by performing a procedure comprising the steps of forming a numerical signature σ of the matrix, and looking up a value for the information needed in an array employing the signature σ as an index to the array.

In accordance with a fifth aspect of the invention there is provided a computer readable medium upon which is written instructions defining a procedure for operating on a matrix of j transform coefficients $c_0 \ldots c_{j-1}$ representing a block of digital video data to determine information needed to generate an encoded version of the matrix, the procedure comprising the steps forming a numerical signature σ of the matrix, and looking up a value for the information needed in an array employing the signature σ as an index to the array.

BRIEF DESCRIPTION OF THE DRAWINGS

For a better understanding of the invention, and to show how the same may be carried into effect, reference will now be made, by way of example, to the accompanying drawings, in which FIG. 1 is shows a 4×4 matrix of H.264 transform coefficients, the same 4×4 matrix showing the ordering of the zig-zag scan, and the reordered coefficients of the matrix.

DETAILED DESCRIPTION

Figure 2:
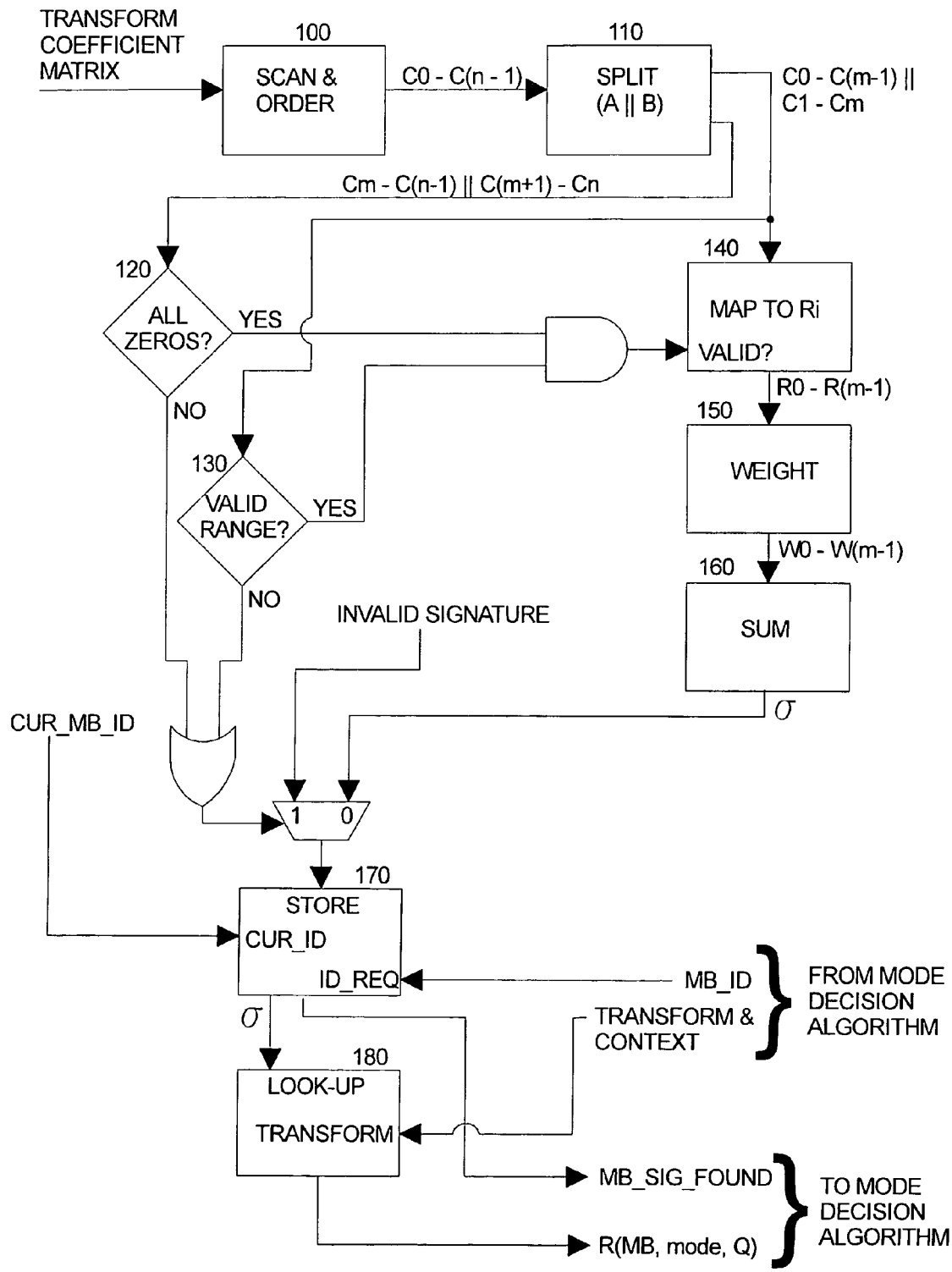
FIG. 2 is a flow chart describing a method embodying the present invention for determining the number of bits needed to encode a 4×4 H.264 transform coefficient matrix.

FIG. 2 illustrates a flow chart depicting a method for determining the value of R(MB, mode, Q) for an H.264 transform coefficient matrix. FIG. 2 is provided to assist in understanding the functional steps of the method but should not be regarded as illustrating the method's only possible implementation.

Referring to FIG. 2, the input to step 100 is an H.264 transform coefficient matrix calculated from a macroblock of digital video data. The matrix is to be encoded using CAVLC encoding and contains n coefficients, where n can equal 16 or 4. In step 100, the coefficients are linearly ordered from $c_0$ through $c_{(n-1)}$ by the zig-zag scan or field scan, as shown in FIG. 1.

Referring again to FIG. 2, in step 110, the coefficients are split into two groups. The first group is a sub-set of m coefficients $c_0$-$c_{m-1}$, or $c_1$-$c_m$, where the value of m is implementation dependent. The sub-set begins with $c_0$ or $c_1$ depending on the type of macroblock the matrix was created from. A sub-set created from a 4×4 residual block or from a 4×4 block of DC values for an Intra-16×16 macroblock contains coefficients $c_0$ through $c_{m-1}$. A sub-set created from a 4×4 residual block of AC coefficients for an Intra-16×16 macroblock or from a 4×4 residual block of AC coefficients for chroma samples contain coefficients $c_1$ through cm and coefficient $c_0$ (the DC coefficient) is discarded. The second group is composed of the remaining coefficients $c_m$ through $c_{n-1}$ or $c_{m+1}$ through $c_{n-1}$.

For 2×2 matrices of DC values for the chroma coefficient transforms, the coefficients are ordered $c_0$-$c_3$ and are read out in a left-to-right, top-to-bottom scan in step 100 and the value of m is generally set to 4 in step 110.

All subsequent operations performed on a sub-set are identical, regardless of whether the sub-set begins with $c_0$ or $c_1$, or if the current matrix is a 4×4 matrix or a 2×2 matrix. For the purpose of clarity, a 4×4 matrix and a sub-set of coefficients $c_0$ through $c_{m-1}$ will be assumed for all further examples unless otherwise noted.

Referring again to FIG. 2, in steps 120 and 130 the coefficients are tested to determine if they adhere to certain rules. Matrices whose coefficients adhere to these rules are deemed valid. In a valid matrix each coefficient $c_i$, for i less than m, has a value that can be expressed by no more than a certain, implementation dependent, number of bits $b_i$ and each coefficient $c_i$, for i greater than or equal to m, is equal to zero. Generally, the value of $b_i$ is greater than or equal to the value of $b_{i+1}$.

In step 120, the coefficients in the second group are tested to determine whether each coefficient $c_m$-$c_{15}$ equals zero. This is done because the second group is not used by the method to determine R(MB, mode, Q) and therefore must not contain any information about the coefficients' macroblock. If any coefficient in the second group has a non-zero value, then the matrix is not valid and R(MB, mode, Q) must be found by an alternative method, which may be the computationally intensive conventional method. For a 2×2 matrix with m equal to 4, all the matrix coefficients are used by the method and step 120 is not applicable.

In accordance with the H.264 standard, each coefficient has a range of possible values defined by the number of bits used to represent that coefficient. Because H.264 transform coefficients are 16 bit integers, each coefficient has $$2^{16}=65{,}536$$

possible values. Since the transform uses signed integers and includes zero, each coefficient can be in the range:

$$c_{min}=-2^{15}=-32{,}768 \text{ to}$$

$$c_{max}=2^{15}-1=32{,}767.$$

However, the method does not need to be able to determine R(MB, mode, Q) for the full range of possible coefficient values to be able to function for the majority of matrices encountered by the encoder. For many matrices, a coefficient $c_i$ will generally fall into a range that requires less than 16 bits to represent. For instance, coefficients are often in the range of −1 to 1 and require only two bits, e.g. one magnitude bit and one sign bit, to represent.

In step 130, a test is performed on the ordered sub-set of coefficients $c_0$-$c_{m-1}$ to determine whether they fall into a pre-specified range of valid values. A valid value of $c_i$ must be capable of being represented by a number of bits $b_i$. For instance, if $b_3$=4, then $c_3$ must fall in the range of −7 through 8, the minimum and maximum values that can be represented by 3 magnitude bits and 1 sign bit. If the magnitude of the coefficient $c_i$ is too large to be represented by $b_i$−1 bits then the encoder must revert to the alternative method of determining R(MB, mode, Q).

The values of m and $b_0$-$b_{m-1}$ define a set of valid matrices. During an initialization phase of the H.264 encoder, for every transformed matrix type (Intra, D.C., Inter, etc.) the value of R(MB, mode, Q) is calculated for each valid matrix using the alternative method for each potential coding mode. The R(MB, mode, Q) values are then stored in an array of addressable locations. Preferably, the addressable locations are organized as nine look-up tables, where each table corresponds to the R(MB, mode, Q) values for a specific matrix type: 4 for matrices of luma coefficients from a frame type picture, 4 for matrices of luma coefficients from a field type picture and 1 for matrices of chroma coefficients Also stored in the look-up tables is the number of non-zero coefficients in the matrix, which is needed for generating the encoded version of the matrix. The number of valid matrices, and thus the number of required entries L in each of the look-up tables is a function of m and $b_0$-$b_{m-1}$:

$$L = 2^k \text{ where } k = \sum_{i=0}^{m-1} b_i.$$

Unique signatures are calculated for all valid matrices and are used as indices to the tables. If a matrix's coefficients pass steps 120 and 130 the method knows that a value of R(MB, mode, Q) can be found in the look-up tables and the matrix's unique index in the look-up tables must then be calculated.

While the method uses nine logical tables to form the array of addressable locations, no specific configuration of physical tables is required. For instance, rather than use nine different physical tables, a single physical table with nine addressable fields could be used.

In step 140, if the matrix is valid, each coefficient $c_i$ in the sub-set is mapped to an unsigned integer representation $r_i$:

$$r_i = c_i + 2^{b_i-1} - 1.$$

Figure 3A:
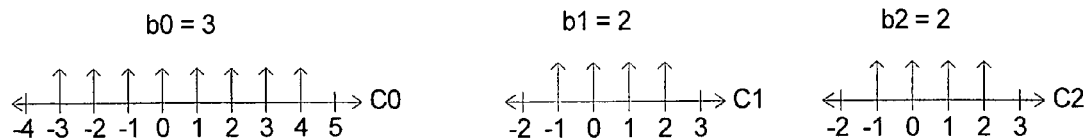
FIG. 3A shows the range of valid values of three H.264 transform coefficients when their binary representations are limited to 3 bits, 2 bits and 2 bits respectively.
Figure 3B:
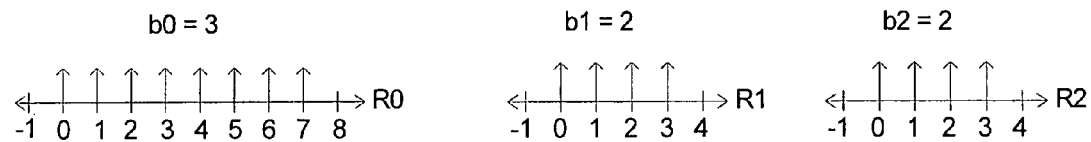
FIG. 3B shows the range of possible values of a mapping of the three transform coefficients of FIG. 3A to unsigned integer representations.
Figure 3C:
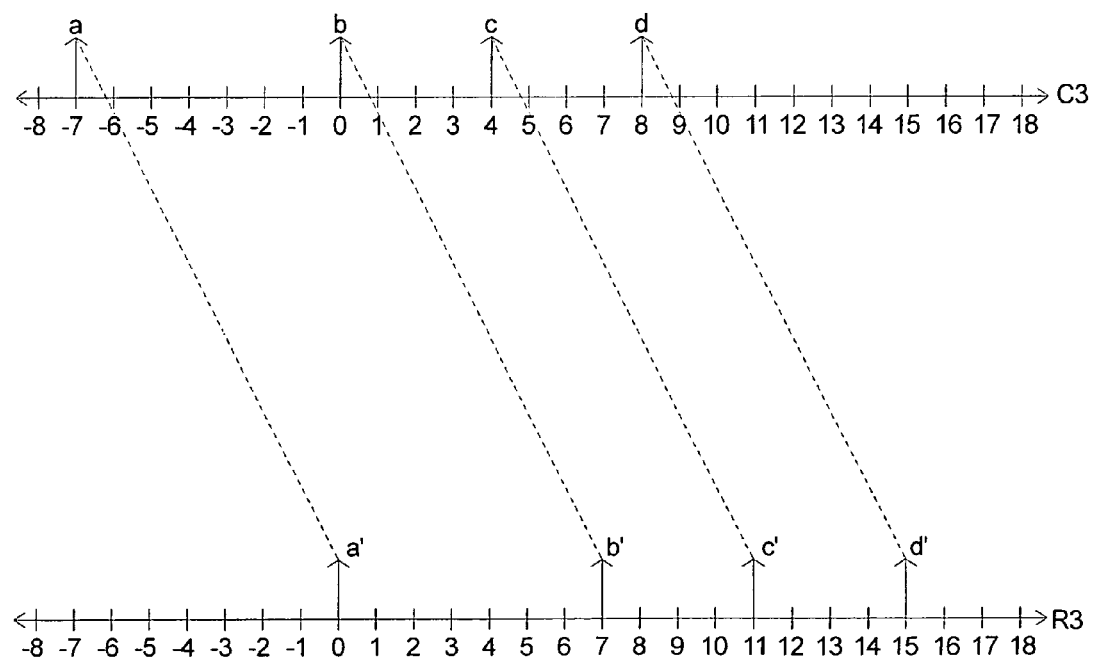
FIG. 3C shows the mapping of 4 possible coefficient values to their corresponding unsigned integer representations when the coefficients magnitude is limited to 4 bits.

Referring to FIGS. 3A-3C, this mapping shifts the coefficients from a range centered at zero on the number line (FIG. 3A), to a new range centered at $2^{b_i-1}-1$ (FIG. 3B). Using the example of $b_3$=4 (FIG. 3C):

$$c_3 = c_{3\text{-}min} = -7 \rightarrow r_3 = -7 + 2^{(4-1)} - 1 = -7 + 8 - 1 = 0$$

(shown in FIG. 3C a:a'), $$c_3 = c_{3\text{-}mid} = 0 \rightarrow r_3 = 0 + 2^{(4-1)} - 1 = 0 + 8 - 1 = 7$$

(shown in FIG. 3C b:b'), $$c_3 = 4 \rightarrow r_3 = 4 + 2^{(4-1)} - 1 = 4 + 8 - 1 = 11$$

(shown in FIG. 3C c:c'), and $$c_3 = c_{3\text{-}max} = 8 \rightarrow r_3 = 7 + 2^{(4-1)} - 1 = 8 + 8 - 1 = 15$$

(shown in FIG. 3C d:d').

In step 150, the mapped representations $r_0$-$r_{m-1}$ are weighted, such that $r_i$ is weighted more heavily than $r_{i-1}$:

$$w_k = 2^{t_k} r_k \text{ where } t_k = 0 \text{ for } k = 0, \text{ and } t_k = \sum_{i=0}^{k-1} b_i \text{ for } k \neq 0$$

Figure 4:
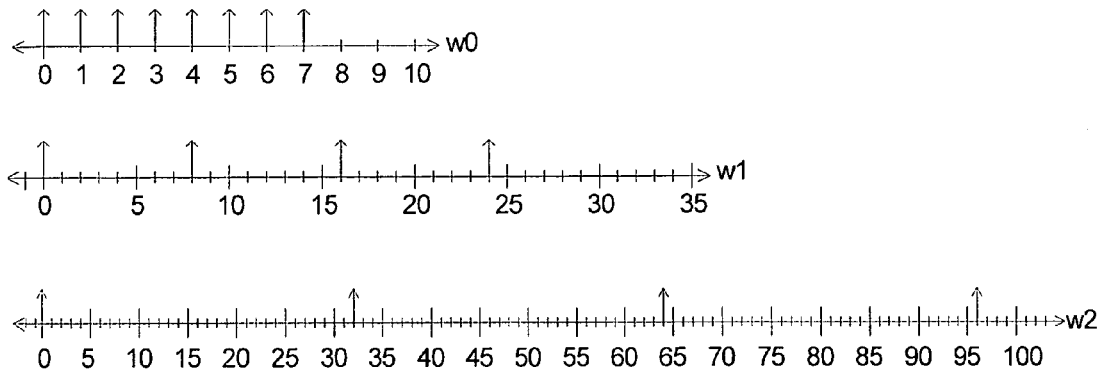
FIG. 4 shows the possible valid values of the weighted representations of 3 coefficients $c_0$, $c_1$ and $c_2$ when their binary representations are limited to 3 bits, 2 bits and 2 bits respectively.

In binary, the weighting is accomplished by shifting $r_k$ to the left $t_k$ times. Referring to FIG. 4, if m=3 and $b_{0\text{-}2}$=[3, 2, 2] as in the above example, then $t_{0\text{-}2}$=[0, 3, 5]. In binary, the weighting is accomplished by shifting $r_k$ to the left $t_k$ times. Because $r_0$ has valid values of [0, 1, 2, 3, 4, 5, 6, 7], valid values of $w_0$ are:

$$w_{0\text{-}d} = 2^{t0} r_{0\text{-}d} = 2^0 [0, 1, 2, 3, 4, 5, 6, 7] = [0, 1, 2, 3, 4, 5, 6, 7] \text{ or}$$

$$w_{0\text{-}b} = r_{0\text{-}b} << t_0 = [000_b, \ldots, 111_b] << 0 = [000_b, \ldots, 111_b].$$

(Note that the subscript b on a number denotes a binary representation; also that $[a_b, c_b, d_b] << x$ denotes shifting the binary representations of a, c and d to the left x number of times).

For $w_1$, $r_1$ has valid values of [0, 1, 2, 3], so valid values of $w_1$ are:

$$w_{1\text{-}d} = 2^{t1} r_{1\text{-}d} = 8 r_{1\text{-}d} = 8[0, 1, 2, 3] = [0, 8, 16, 24] \text{ or}$$

$$w_{1\text{-}b} = r_{1\text{-}b} << t_1 = [00_b, 01_b, 10_b, 11_b] << 3 = [00000_b, 01000_b, 10000_b, 11000_b].$$

For $w_2$, $r_2$ has valid values of [0, 1, 2, 3], so valid values for $w_2$ are:

$$w_{2\text{-}d} = 2^{t2} r_{2\text{-}d} = 2^5 [0, 1, 2, 3] = [0, 32, 64, 96] \text{ or}$$

$$w_{2\text{-}b} = r_{2\text{-}b} << t_2 = [00_b, 01_b, 10_b, 11_b] << 5 = [0000000_b, 0100000_b, 1000000_b, 1100000_b].$$

Referring again to FIG. 2, in step 160, the weighted representations $w_0$-$w_{m-1}$ are summed to form a signature σ for the matrix. The mapping and weighting of the coefficients in the previous steps ensures a unique signature is created for each valid set of coefficients. For this example:

$$\sigma = \sum_{k=0}^{m-1} w_k = w_0 + w_1 + w_2.$$

Figure 5:
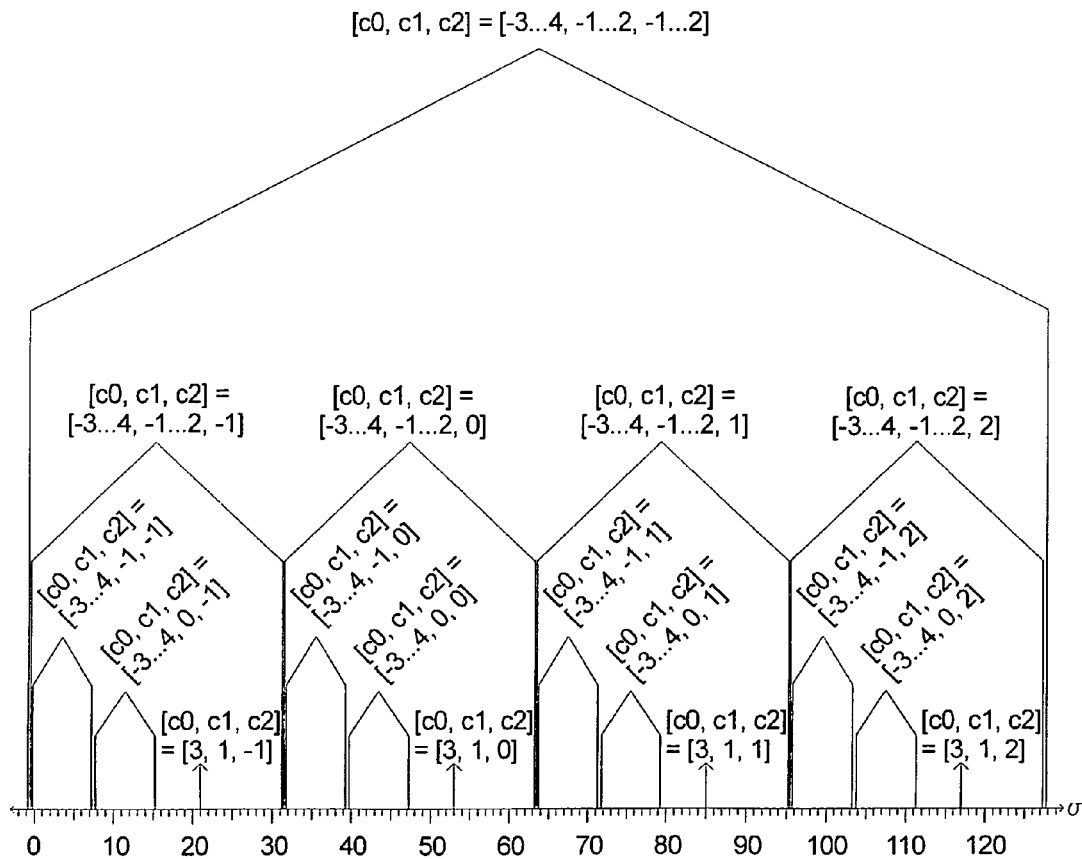
FIG. 5 shows the range of possible signature values for various sets of values of coefficients $c_0$, $c_1$ and $c_2$ when their binary representations are limited to 3 bits, 2 bits and 2 bits respectively.
Figure 6:
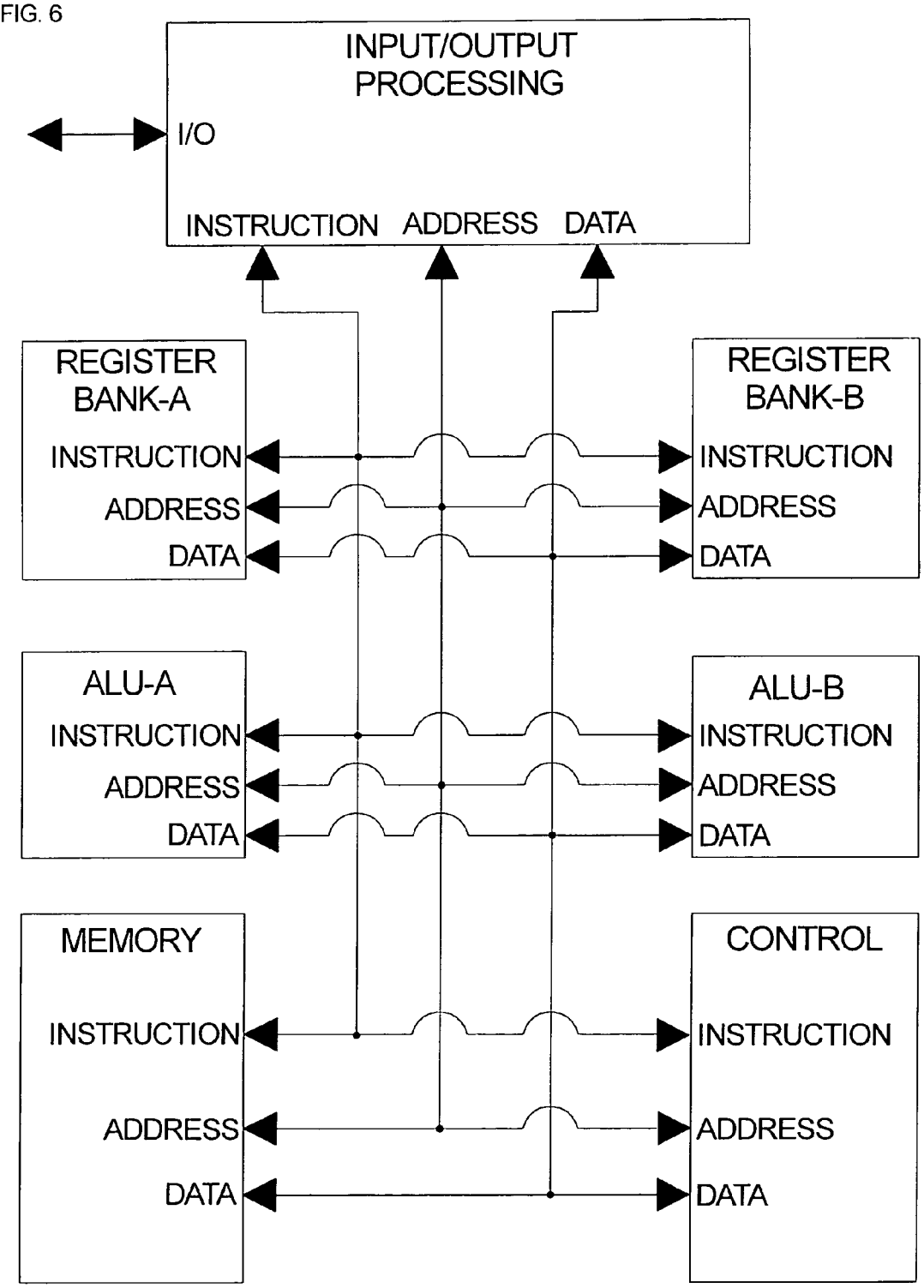
FIG. 6 shows a block diagram of a computing machine capable of implementing the method shown in FIG. 2.

The possible valid signature values range from 0 through $2^{(b0+b1+b2)}-1$. Referring to FIG. 5, for the example of m=3, $b_0$=3, $b_1$=2 and $b_2$=2. If:

$$[c_0, c_1, c_2] = [c_{0\text{-}min}, c_{1\text{-}min}, c_{2\text{-}min}]$$
$$= [-2^{b0-1} + 1, -2^{b1-1} + 1, -2^{b2-1} + 1]$$
$$= [-3, -1, -1],$$

then:

$$[w_0, w_1, w_2] = [0, 0, 0] \text{ (see FIG. 4)}$$

and $$\sigma_{min} = 0 + 0 + 0 = 0°$$

Whereas, if:

$$[c_0, c_1, c_2] = [c_{0-max}, c_{1-max}, c_{2-max}]$$
$$= [2^{b0-1}, 2^{b1-1}, 2^{b2-1}]$$
$$= [4, 2, 2],$$

then:

$$[w_0, w_1, w_2] = [7, 24, 96] \text{ (see FIG. 4)}$$

and $$\sigma_{max} = 7+24+96 = 127.$$

Referring again to FIG. 5, the method creates a unique signature for each valid matrix. For given values of m and $b_0$-$b_{m-1}$, the set of valid coefficients with the lowest possible values will generate a signature of 0, the next lowest valued set of valid coefficients will generate a signature of 1 and so on, with no gaps or overlaps. Calculating σ in binary shows this more effectively.

For the above example:

$$[c_{0-b}, c_{1-b}, c_{2-b}] = [c_{0-b-max}, c_{1-b-max}, c_{2-b-max}] = [100_b, 10_b, 10_b],$$

then:

$$[w_{0-b}, w_{1-b}, w_{2-b}] = [111_b, 11000_b, 1100000_b]$$

and $\sigma_{b-max}$: $w_{0-b}$ 0000111 $w_{1-b}$ 0011000

$\phantom{\sigma_{b-max}:}\underline{+w_{2-b}\phantom{xx} 1\phantom{x}1\phantom{x}0\phantom{x}0\phantom{x}0\phantom{x}0\phantom{x}0}$ $\phantom{\sigma_{b-max}:}\overline{\sigma_{b-max} = \phantom{x}1\phantom{x}1\phantom{x}1\phantom{x}1\phantom{x}1\phantom{x}1\phantom{x}1}$ Referring again to FIG. 2, in step 170, the signatures of valid matrices are stored in a buffer with an identifier associated with the matrix's macroblock (CUR-MB-ID). If an invalid matrix is encountered an invalid signature is stored in the buffer instead. When the encoder needs to make the mode decision for a particular macroblock, the mode decision algorithm will query the buffer by sending the macroblock's identifier on the MB_ID signal and the buffer will respond by activating the MB_SIG_FOUND signal and sending the matrix's signature σ to the look-up tables. If the transform matrix is valid, the valid signature will be passed to the look-up tables.

In step 180, in response to the MB_SIG_FOUND signal from step 170, one of the nine tables containing the values of R(MB, mode, Q) for all valid matrices is addressed by the encoder's mode decision algorithm via the TRANSFORM & CONTEXT request. The value of R(MB, mode, Q) for the macroblock specified by the MB_ID signal and the mode specified by the TRANSFORM & CONTEXT request is returned to the mode decision algorithm. If the macroblock in question has an invalid transform matrix, then a special value is returned to the mode decision algorithm indicating that R(MB, mode, Q) must be found using the alternative method.

The mode decision algorithm will, if applicable, make requests for several different values of R(MB, mode, Q) for a given macroblock. The mode decision algorithm compares the values returned in response to the requests and selects a desired coding mode based on the values.

Because the calculation of a matrix's signature is less computationally demanding than calculating R(MB, mode, Q) in the conventional way, this method can be implemented with any computer architecture to save processing time. However, the greatest benefit can be attained using an architecture that provides multiple functional execution units capable of operating concurrently, such as the Texas Instruments TMS320C64x family of processors. When the method is implemented on such an architecture, the calculation of the signature can be interleaved with the calculation of the transform coefficient matrix using functional units not otherwise in use during a given clock cycle. For a given macroblock, functional units not in use during the calculation of $c_i$ for i<m can be delegated to testing the validity of $c_{i-1}$ and calculating $w_{i-1}$. During the calculation of coefficients $c_m$-$c_{15}$ the weighted representations $w_0$-$w_{m-1}$ can be summed to find σ. The value of σ can be stored and when the encoder subsequently needs to make the mode decision for the macroblock, the values of R(MB, mode, Q) for each available mode can be looked up in the tables. Thus, for a valid matrix, the computation time of R(MB, mode, Q) is effectively zero compared to the alternative method and no time is lost to the encoder if an invalid matrix is encountered. Source code implementing such a "zero computation time" embodiment of the present invention is attached hereto as Appendix A (in Appendix A, note that a "||" character at the beginning of an instruction indicates that the instruction is to be executed in parallel with the previous instruction).

In another embodiment of the invention during the initialization phase of the H.264 encoder, in addition to the value of R(MB, mode, Q) being calculated for each valid matrix, the actual bit stream necessary to the transform for performing the CAVLC encoding is calculated and stored in the look-up tables. Because the actual CAVLC bit streams will use the same signatures as indexes as the numbers of bits and number of non-zero transform coefficients, they can all be stored in the same table. During operation, after the appropriate mode has been determined by using the signature of the matrix to minimize J(MB, mode, Q), the signature is used to access the actual bit stream required for the particular matrix and encoding mode.

It will be appreciated that the invention is not restricted to the particular embodiment that has been described, and that variations may be made therein without departing from the scope of the invention as defined in the appended claims and equivalents thereof. For example, it will be appreciated that generally an H.264 encoder embodying the present invention will require a macroblock identifier as an input to step 170 so that a value of σ can be associated with the macroblock and subsequently accessed upon the request of the mode decision algorithm. However if the encoder is operating in lock-step, the table in step 170 could be replaced with a First In, First Out (FIFO) style buffer of such a length that a macroblock's signature σ will be out put from step 170 at precisely the time the mode decision algorithm will be querying step 180 for the macroblock's R(MB, mode, Q) value. This modification would also obviate the need for the MB_ID signal from the mode decision algorithm.

Unless the context indicates otherwise, a reference in a claim to the number of instances of an element, be it a reference to one instance or more than one instance, requires at least the stated number of instances but is not intended to exclude from the scope of the claim a structure having more instances of that element than stated.

The invention claimed is:

1. A method of employing a mode selection function J for selecting a coding mode from a plurality of coding modes for a matrix of j transform coefficients $c_0 \ldots c_{j-1}$ representing a block of digital video data, the method comprising:

a) receiving, by a computing machine, the matrix of j transform coefficients $c_0 \ldots c_{j-1}$ representing the block of digital video data;
b) forming, by the computing machine, a numerical signature σ of the matrix,
c) determining, by the computing machine, at least one value of a parameter R based on an array using σ as an index to the array, wherein J is a function of R and each value of R equals the size, in bits, of an encoded version of the matrix encoded with one of the plurality of coding modes,
d) inputting, by the computing machine, each value of R as an input to an algorithm to determine a corresponding value of J,
e) selecting, by the computing machine, the coding mode corresponding to a minimum value of J, and
f) encoding, by the computing machine, the matrix of j transform coefficients $c_0 \ldots c_{j-1}$ based on the selecting.

2. A method according to claim 1, comprising calculating σ using a group of the coefficients in accordance with a procedure that returns a unique value of σ for each unique set of coefficient values and wherein step a comprises:
   a1) linearly ordering the coefficients $c_0, c_1, \ldots, c_{j-1}$,
   a2) selecting a group of m sequentially ordered coefficients $c_u$ through $c_v$ where u is less than v and v equals u+m−1,
   a3) mapping each coefficient $c_i$ in the group to an unsigned integer representation $r_i$,
   a4) weighting each integer representation $r_i$ to form a weighted representation $w_i$, and
   a5) combining the weighted representations $w_u \ldots w_v$ to form σ.

3. A method according to claim 1, wherein prior to step b, the method comprises calculating a σ value and a value of R for each of the plurality of coding modes for every matrix in which the value of each coefficient falls within a predetermined range.

4. A method according to claim 3, wherein for every unique combination of σ and coding mode there is a single R value, and the method comprises, prior to step b, creating at least one table in which each calculated R value is stored, and creating the array, wherein the array includes said at least one table.

5. A method according to claim 1, comprising performing step a in parallel with calculating transform coefficients $c_0 \ldots c_{j-1}$.

6. A computing machine for receiving a matrix of j transform coefficients $c_0 \ldots c_{j-}$, the coefficients representing a block of digital video data, the machine being programmed to operate on the coefficients $c_0 \ldots c_{j-1}$ to determine information needed to generate an encoded version of the matrix by performing a procedure comprising the steps:
   a) receiving, by the computing machine, the matrix of j transform coefficients $c_0 \ldots c_{j-1}$,
   b) determining, by the computing machine, whether the matrix complies with a validity test,
   c) forming, by the computing machine, a numerical signature σ of the matrix when it is determined that the matrix complies with the validity test, and
   d) generating, by the computing machine, the encoded version of the matrix by looking up a value for the information needed for generating the encoded version in an array employing the signature σ as an index to the array.

7. A computing machine according to claim 6 wherein the programmed procedure comprises calculating σ using a group of the coefficients in accordance with a function that returns a unique value of σ for each unique set of coefficient values.

8. A computing machine according to claim 6, wherein step a of the programmed procedure comprises:
   a1) linearly ordering the coefficients $c_0, c_1, \ldots, c_{j-1}$,
   a2) selecting a group of m sequentially ordered coefficients $c_u$ through $c_v$ where u is less than v and v equals u+m−1,
   a3) mapping each coefficient $c_i$ in the group to an unsigned integer representation $r_i$,
   a4) weighting each integer representation $r_i$ to form a weighted representation $w_i$, and
   a5) combining the weighted representations $w_u \ldots w_v$ to form σ.

9. A computing machine according to claim 8, wherein step a1 of the programmed procedure comprises ordering the coefficients according to a zig-zag scan.

10. A computing machine according to claim 8, wherein step a1 of the programmed procedure comprises ordering the coefficients according to a left-to-right-top-to-bottom scan.

11. A computing machine according to claim 8, wherein each coefficient $c_i$ in the group is limited to a predefined range of possible values and the predefined range of possible values for coefficient $c_i$ is greater than the predefined range of possible values for coefficient $c_{i+1}$.

12. A computing machine according to claim 8, wherein coefficients $c_{v+1} \ldots c_{j-1}$ equal zero.

13. A computing machine according to claim 8, wherein $c_i$ is represented by a maximum number of bits $b_i$ and step a3 of the programmed procedure comprises:
   calculating $r_i$ for each coefficient $c_i$ in the group according to the equation:

$$r_i = c_i + 2^{bi-1} - 1.$$

14. A computing machine according to claim 8, wherein step a4 of the programmed procedure comprises:
   calculating $w_i$ for each coefficient $c_i$ in the group according to the equation:

$$w_k = 2^{tk} r_k, \text{ where } t_k = 0 \text{ for } k = u \text{ and } t_k = \sum_{i=0}^{k-1} b_i \text{ for } k > u.$$

15. A computing machine according to claim 8, wherein step a5 of the programmed procedure comprises summing the weighted representations $w_u \ldots w_v$ to calculate σ.

16. A computing machine according to claim 8, wherein step a of the programmed procedure further comprises:
   receiving an identifier associated with the matrix, and, after step a5,
   storing σ in a holding table using the matrix's identifier as an index.

17. A computing machine according to claim 16, wherein the array comprises a plurality of data tables and the programmed procedure further comprises, between step a and step b:
   receiving a communication from a requestor indicating a data table, and
   receiving the identifier from the requestor,
step b further comprises:
   using the identifier as an index to the holding table to retrieve σ, and
   reading a value of the information needed from the indicated data table,
and, after step b, the programmed procedure further comprises:
   returning the value of the information needed to the requestor.

18. A computing machine according to claim 6, wherein the array comprises multiple data tables and step b of the programmed procedure comprises:
   receiving a communication from a requestor indicating a data table,
   reading the value of the information needed from the indicated data table, and
   returning the value of the information needed to the requestor.

19. A computing machine according to claim 6, wherein, prior to step b, the programmed procedure comprises calculating σ and the information needed for every matrix in which the value of each coefficient falls within a predetermined range.

20. A computing machine according to claim 19, wherein, prior to step b, the programmed procedure comprises creating the array, wherein the array contains the calculated values of the information needed indexed by the calculated σ values.

21. A computing machine according to claim 6, wherein the programmed procedure comprises performing step a in parallel with calculating transform coefficients $c_0 \ldots c_{j-1}$.

22. A computing machine according to claim 6, wherein the information needed is a number of bits R equivalent to the length of the encoded version of the matrix.

23. A computing machine according to claim 6, wherein the information needed is a sequence of bits S that is equivalent to an encoded version of the matrix of transform coefficients.

24. A non-transitory computer readable storage medium upon which is stored instructions defining a procedure for operating on a matrix of j transform coefficients $c_0 \ldots c_{j-1}$ representing a block of digital video data to determine information needed to generate an encoded version of the matrix, the procedure comprising the steps:
   a) receiving the matrix of j transform coefficients $c_0 \ldots c_{j-1}$,
   b) determining whether the matrix complies with a validity test,
   c) forming a numerical signature σ of the matrix when it is determined that the matrix complies with the validity test, and
   d) generating the encoded version of the matrix by looking up a value for the information needed for generating the encoded version in an array employing the signature σ as an index to the array.

25. A computer readable medium according to claim 24, wherein the procedure comprises calculating σ using a group of the coefficients in accordance with a function that returns a unique value of σ for each unique set of coefficient values.

26. A computer readable medium according to claim 24, wherein step a of the procedure comprises:
   a1) linearly ordering the coefficients $c_0, c_1, \ldots, c_{-1}$,
   a2) selecting a group of m sequentially ordered coefficients $c_u$ through $c_v$ where u is less than v and v equals u+m−1,
   a3) mapping each coefficient $c_i$ in the group to an unsigned integer representation $r_i$,
   a4) weighting each integer representation $r_i$ to form a weighted representation $w_i$, and
   a5) combining the weighted representations $w_u \ldots w_v$ to form σ.

27. A computer readable medium according to claim 26, wherein step a1 of the programmed procedure comprises ordering the coefficients according to a zig-zag scan.

28. A computer readable medium according to claim 26, wherein step a1 of the programmed procedure comprises ordering the coefficients according to a left-to-right-top-to-bottom scan.

29. A computer readable medium according to claim 26, wherein each coefficient $c_i$ in the group is limited to a predefined range of possible values and the predefined range of possible values for coefficient $c_i$ is greater than the predefined range of possible values for coefficient $c_{i+1}$.

30. A computer readable medium according to claim 26, wherein coefficients $c_{v+1} \ldots c_{j-1}$ equal zero.

31. A computer readable medium according to claim 26, wherein $c_i$ is represented by a maximum number of bits $b_i$ and step a3 of the procedure comprises:
   calculating $r_i$ for each coefficient $c_i$ in the group according to the equation:

$r_i = c_i + 2^{b_i - 1} - 1.$

32. A computer readable medium according to claim 26, wherein step a4 of the procedure comprises:
   calculating $w_k$ for each coefficient $c_k$ in the group according to the equation:

$$w_k = 2^{t_k} r_k, \text{ where } t_k = 0 \text{ for } k = u \text{ and } t_k = \sum_{i=0}^{k-1} b_i \text{ for } k > u.$$

33. A computer readable medium according to claim 26, wherein step a5 of the procedure comprises summing the weighted representations $w_u \ldots w_v$ to calculate σ.

34. A computer readable medium according to claim 26, wherein step a of the procedure comprises:
   receiving an identifier associated with the matrix, and, after step a5,
   storing σ in a holding table using the matrix's identifier as an index.

35. A computer readable medium according to claim 34, wherein the array comprises a plurality of data tables and the procedure further comprises, between step a and step b:
   receiving a communication from a requestor indicating a data table, and
   receiving the identifier from the requestor,
   step b of the procedure further comprises:
   using the identifier as an index to the holding table to retrieve σ, and
   reading a value of the information needed from the indicated data table,
   and, after step b, the procedure further comprises:
   returning the value of the information needed to the requestor.

36. A computer readable medium according to claim 24, wherein the array comprises multiple data tables and step b of the procedure comprises:
   receiving a communication from a requestor indicating a data table,
   reading the value of the information needed from the indicated data table, and
   returning the value of the information needed to the requestor.

37. A computer readable medium according to claim 24, wherein prior to step b, the procedure comprises calculating σ and the value of the information needed for every matrix in which the value of each coefficient falls within a predetermined range.

38. A computer readable medium according to claim 37, wherein prior to step b, the procedure comprises creating the array, wherein the array contains the calculated values of the information needed indexed by the calculated σ values.

39. A computer readable medium according to claim 24, wherein the procedure comprises performing step a in parallel with calculating integer transform coefficients $c_0 \ldots c_{j-1}$.

40. A computer readable medium according to claim 24, wherein the information needed is a number of bits R equivalent to the length of the encoded version of the matrix.

41. A computer readable medium according to claim 24, wherein the information needed is a sequence of bits S that is equivalent to an encoded version of the matrix of transform coefficients.

* * * * *